United States Patent
Yi et al.

(10) Patent No.: US 10,506,664 B2
(45) Date of Patent: Dec. 10, 2019

(54) METHOD AND APPARATUS FOR SUPPORTING USER EQUIPMENTS CAPABLE OF UPLINK TRANSMISSION ONLY VIA GROUPING IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,638

(22) PCT Filed: Oct. 14, 2016

(86) PCT No.: PCT/KR2016/011555
§ 371 (c)(1),
(2) Date: Apr. 3, 2018

(87) PCT Pub. No.: WO2017/065557
PCT Pub. Date: Apr. 20, 2017

(65) Prior Publication Data
US 2019/0082496 A1    Mar. 14, 2019

Related U.S. Application Data

(60) Provisional application No. 62/241,727, filed on Oct. 14, 2015.

(51) Int. Cl.
*H04W 88/04* (2009.01)
*H04W 72/14* (2009.01)
(Continued)

(52) U.S. Cl.
CPC ............ *H04W 88/04* (2013.01); *H04W 4/80* (2018.02); *H04W 56/001* (2013.01);
(Continued)

(58) Field of Classification Search
None
See application file for complete search history.

(56) References Cited

U.S. PATENT DOCUMENTS

2008/0259857 A1* 10/2008 Zheng .................. H04B 7/155
370/329
2012/0063384 A1* 3/2012 Bi ...................... H04B 7/15557
370/315
(Continued)

FOREIGN PATENT DOCUMENTS

WO    WO 2013/155411 A1    10/2013
WO    WO 2015/047167 A1    4/2015

OTHER PUBLICATIONS

LG Electronics, "Overview on design of uplink for NB-IoT", R1-155801, 3GPP TSG RAN WG1 Meeting #82-bis, Malmo, Sweden, Oct. 5-9, 2015, 7 pgs.

*Primary Examiner* — Brian S Roberts
*Assistant Examiner* — Cassandra L Decker
(74) *Attorney, Agent, or Firm* — Birch, Stewart, Kolasch & Birch, LLP

(57) ABSTRACT

A method and apparatus for performing uplink (UL) transmission in a wireless communication system is provided. A second user equipment (UE) wakes up for transmission of UL data, searches a first UE which is capable of downlink (DL) transmission to the second UE, acquires information for transmission of the UL data, and transmits the UL data to a network by using the acquired information. The second UE may only be capable of UL transmission to the network and may not be capable of DL reception from the network.
(Continued)

Alternatively, the second UE may be capable of UL transmission to the network and may be capable of synchronization from the network.

19 Claims, 5 Drawing Sheets

(51) Int. Cl.
*H04W 4/80* (2018.01)
*H04W 68/02* (2009.01)
*H04W 72/04* (2009.01)
*H04W 72/12* (2009.01)
*H04W 56/00* (2009.01)
*H04L 5/00* (2006.01)

(52) U.S. Cl.
CPC ....... *H04W 68/02* (2013.01); *H04W 72/0446* (2013.01); *H04W 72/1289* (2013.01); *H04W 72/14* (2013.01); *H04L 5/0007* (2013.01)

(56) References Cited

U.S. PATENT DOCUMENTS

| | | |
|---|---|---|
| 2014/0148153 A1 | 5/2014 | Gleixner |
| 2015/0085740 A1 | 3/2015 | Kalapatapu et al. |
| 2015/0117375 A1* | 4/2015 | Sartori ................ H04W 56/001 370/329 |
| 2015/0245305 A1* | 8/2015 | Camps Mur .......... H04W 56/00 370/350 |
| 2016/0183205 A1* | 6/2016 | Li ......................... H04W 8/005 370/350 |
| 2016/0227463 A1* | 8/2016 | Baligh .................. H04W 40/02 |
| 2017/0289957 A1* | 10/2017 | Zhang .................. H04W 68/02 |

* cited by examiner

[Fig. 1]
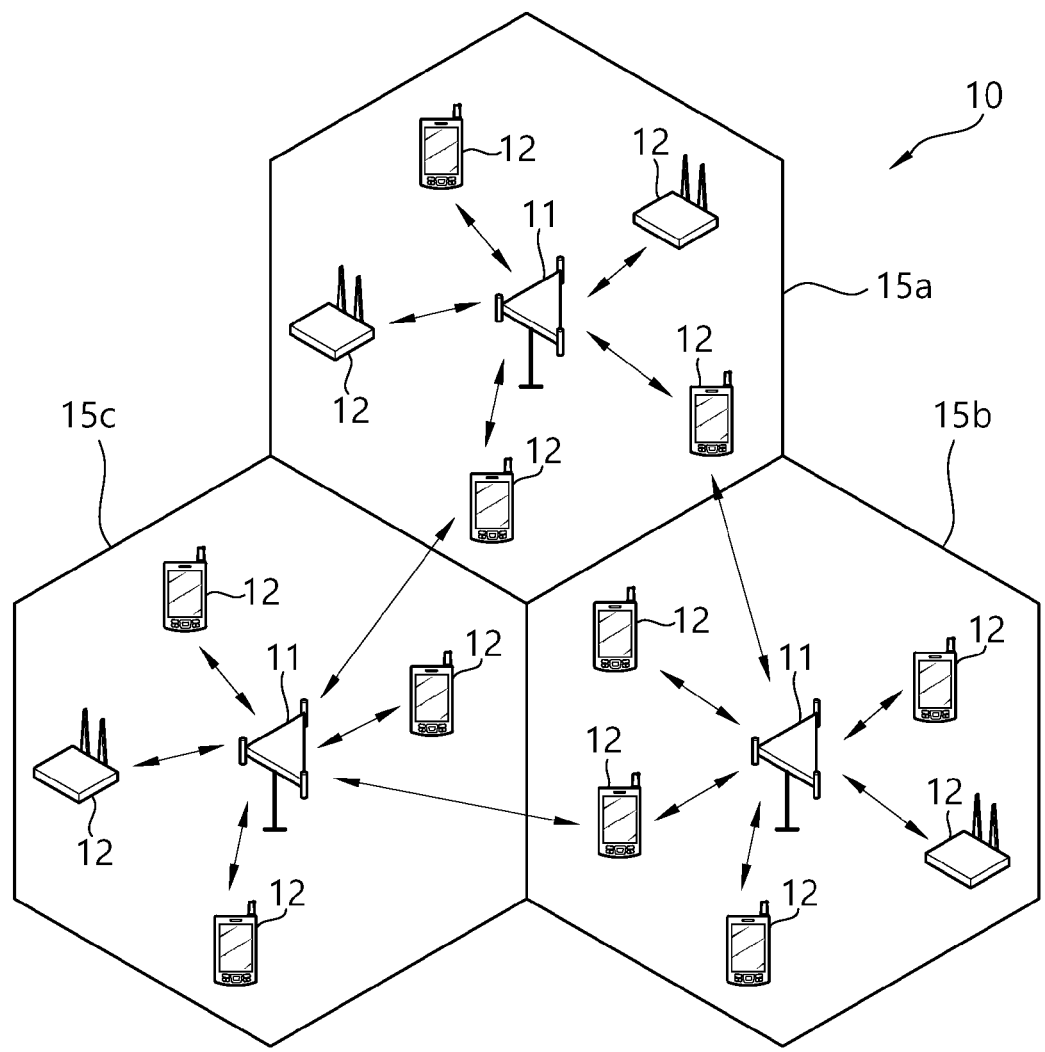
[Fig. 2]
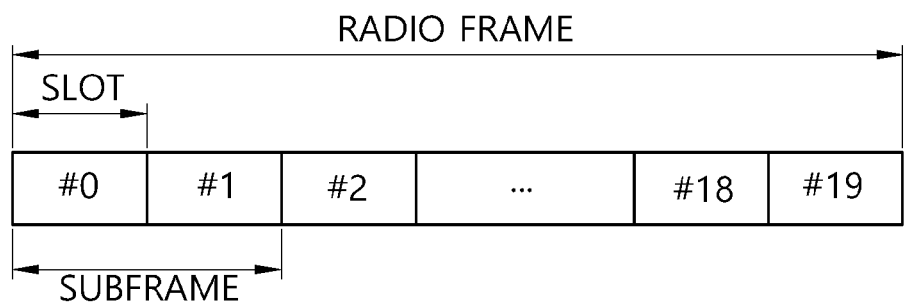

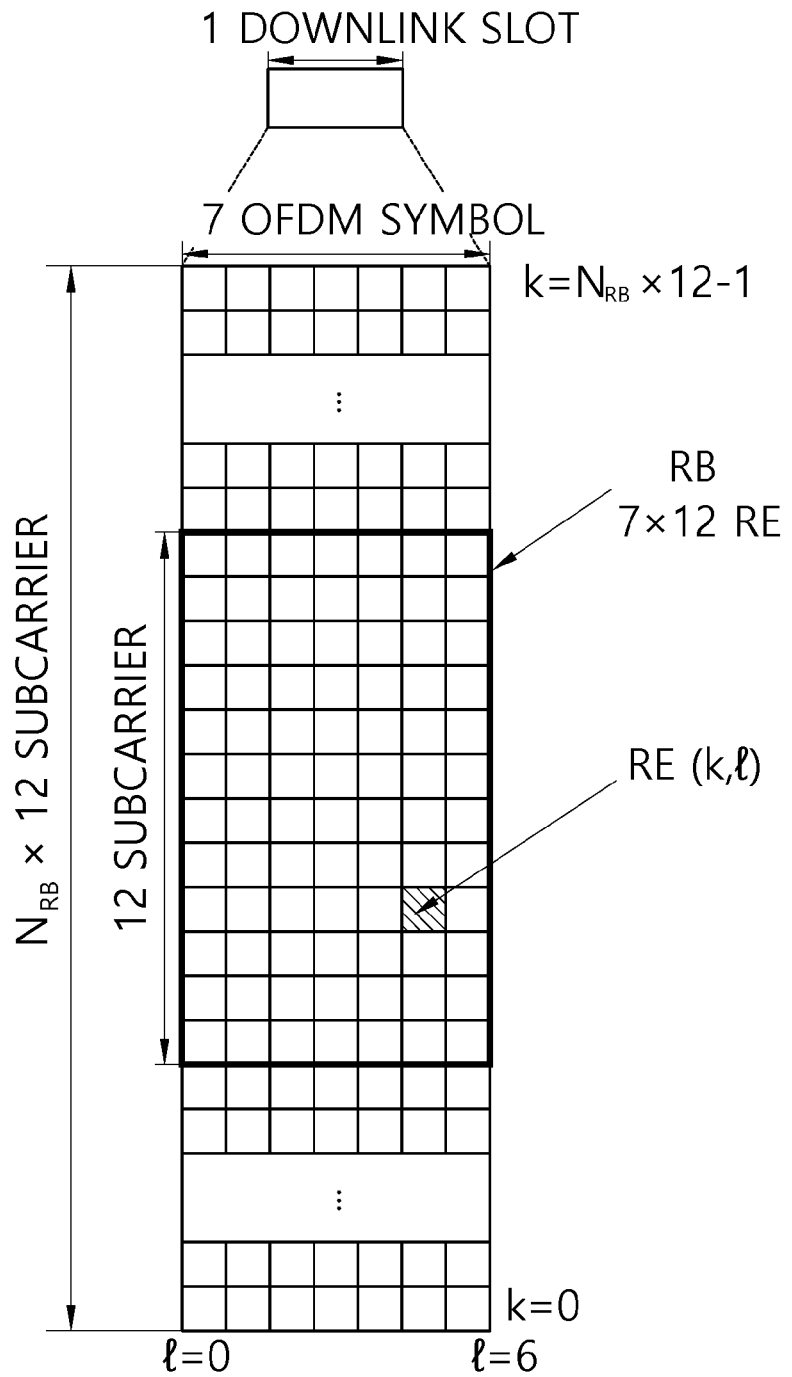
[Fig. 3]

[Fig. 4]
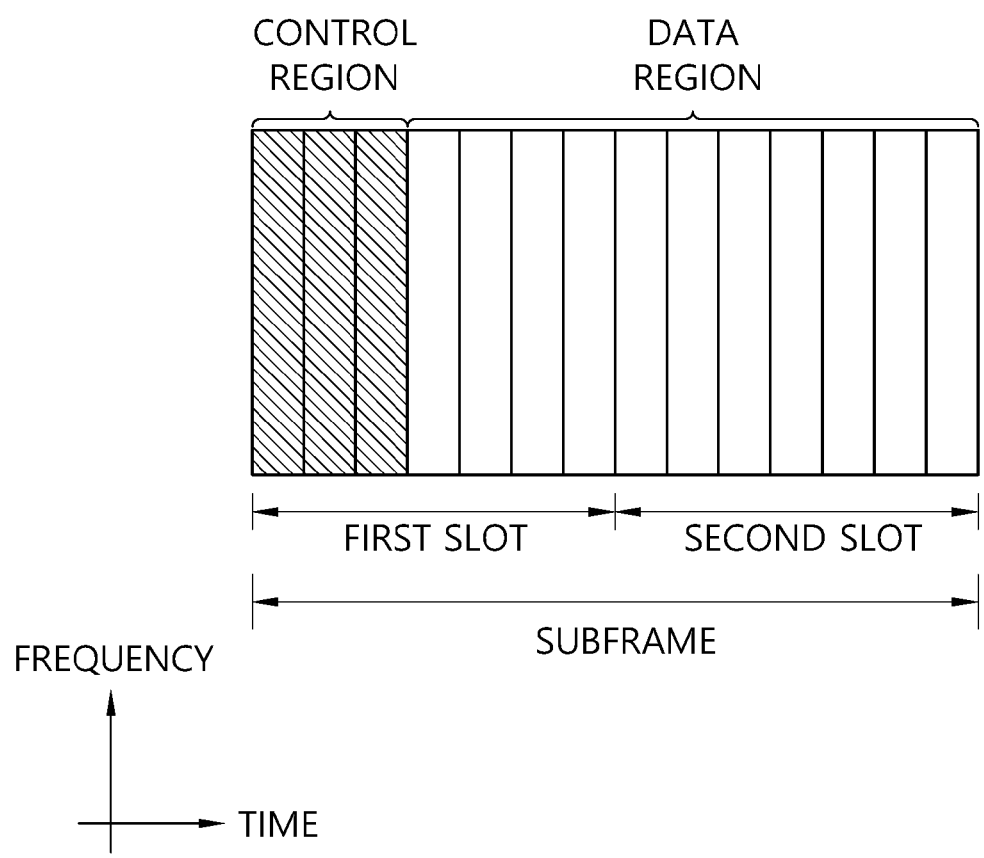

[Fig. 5]
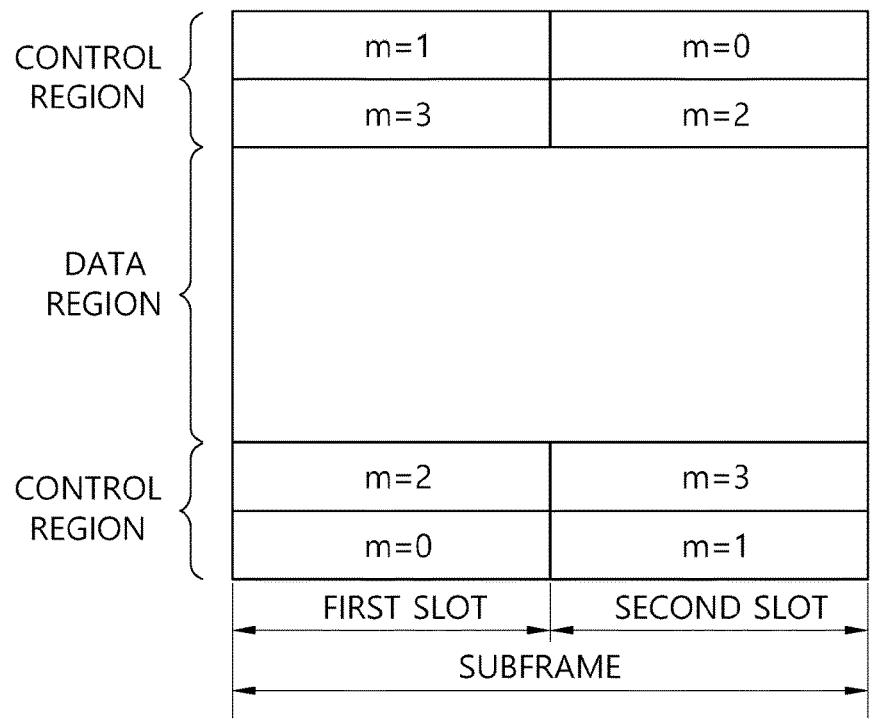
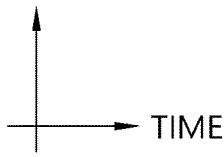
[Fig. 6]
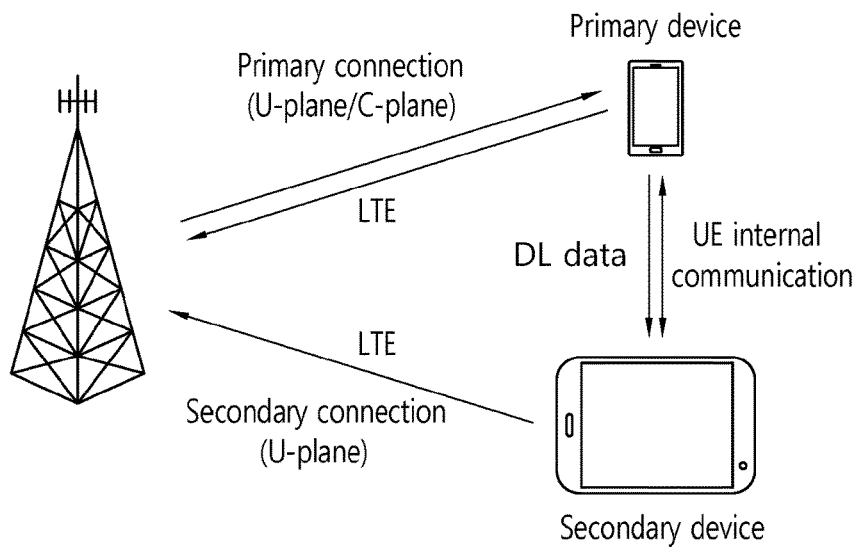

[Fig. 7]
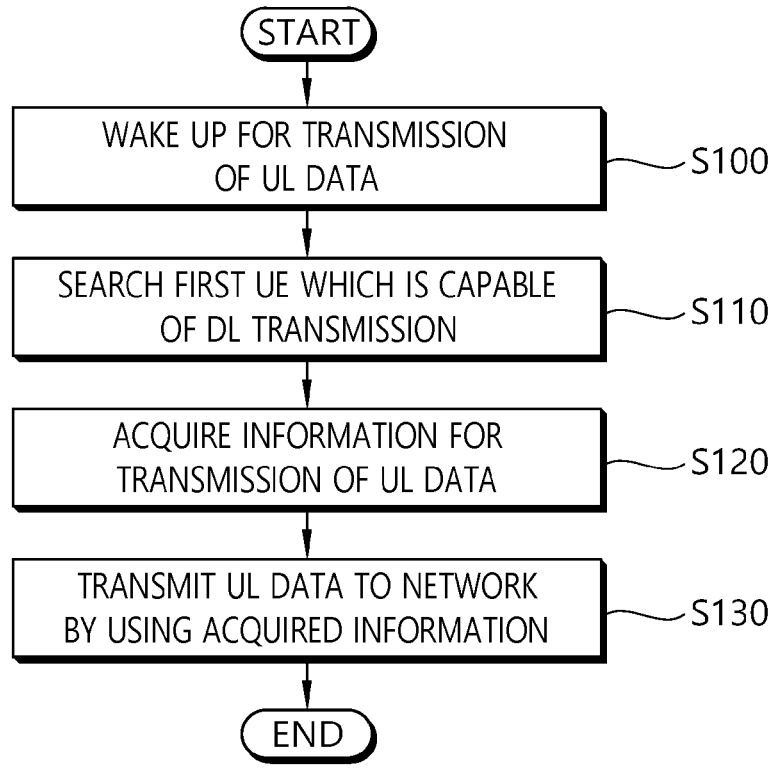
[Fig. 8]
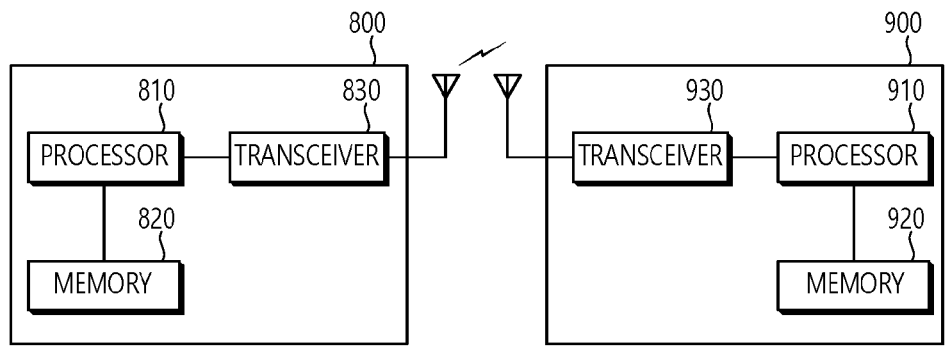

METHOD AND APPARATUS FOR SUPPORTING USER EQUIPMENTS CAPABLE OF UPLINK TRANSMISSION ONLY VIA GROUPING IN WIRELESS COMMUNICATION SYSTEM

CROSS REFERENCE TO RELATED APPLICATIONS

This application is the National Phase of PCT International Application No. PCT/KR2016/011555, filed on Oct. 14, 2016, which claims priority under 35 U.S.C. 119(e) to U.S. Provisional Application No. 62/241,727, filed on Oct. 14, 2015, all of which are hereby expressly incorporated by reference into the present application.

TECHNICAL FIELD

The present invention relates to wireless communications, and more particularly, to a method and apparatus for supporting user equipments (UEs) capable of uplink (UL) transmission only via grouping in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

In the future versions of the LTE-A, it has been considered to configure low-cost/low-end (or, low-complexity) UEs focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

A need for supporting communication between devices with various applications efficiently has been increased in a wireless network, due to introduction of various devices having wireless communication functionality. However, since a number of devices having wireless communication functionality has been exploded, a method for reducing UE complexity may be required.

DISCLOSURE OF INVENTION

Technical Problem

The present invention provides a method and apparatus for supporting user equipments capable of UL transmission only via grouping in a wireless communication system. The present invention discusses mechanisms to support a UE with UL functionality only.

Solution to Problem

In an aspect, a method for performing uplink (UL) transmission, by a second user equipment (UE), in a wireless communication system is provided. The method includes waking up for transmission of UL data, searching a first UE which is capable of downlink (DL) transmission to the second UE, acquiring information for transmission of the UL data, and transmitting the UL data to a network by using the acquired information.

In another aspect, a second user equipment (UE) in a wireless communication system is provided. The second UE includes a memory, a transceiver, and a processor, coupled to the memory and the transceiver, that wakes up for transmission of uplink (UL) data, searches a first UE which is capable of downlink (DL) transmission to the second UE, controls the transceiver to acquire information for transmission of the UL data, and controls the transceiver to transmit the UL data to a network by using the acquired information.

Advantageous Effects of Invention

UE complexity can be reduced by UL functionality only.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of connection scenario according to an embodiment of the present invention.
FIG. 7 shows a method for performing UL according to an embodiment of the present invention.
FIG. 8 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PD-CCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In future of 3GPP LTE, it may be expected that various types of devices, e.g. wearable devices such as smart watches, smart glasses, bio-sensors in addition to smartphones, navigation system and/or car infotainment system within car, and internet-of-things (IoT) devices attached to home appliances within house, etc., may perform data communication by accessing LTE eNB or eNB providing IoT services. It may also be expected that multiple devices, which are controlled by one user and are in proximity with each other, may perform data communication by using low-power communication protocol (e.g. Wi-Fi, Bluetooth, LTE device-to-device (D2D) communication) between devices. For example, one user may carry both smartphone and smart watch which are in proximity with each other. Even though the user moves, the smartphone and smart watch can keep proximity, and accordingly, can perform direct communication by using low-power communication protocol. For another example, many IoT devices, such as light at home, home appliances, etc., may be owned by one or a few users who can control the IoT devices.

If multiple devices in proximity with each other perform communication with LTE eNB independently/separately even though the two devices can share some control information, an amount of information and resources to be controlled by the LTE network may increase as the number of devices increase. It may deteriorate efficiency of LTE network and UE.

Accordingly, a method for managing multiple devices which operate in proximity with each other in cellular network and using radio resources efficiently may be proposed according to embodiments of the present invention. Generally, since DL reception and management with network is heavy processing, it is worthwhile to consider only UL transmission from such devices to the network. DL transmission from the network may be done from the network to the device via a primary device which functions as relay. This may require DL local communication, such as Wi-Fi or Bluetooth, with UL remote communication such as LTE or remote IoT network. According to the present invention, in terms of hardware, the device can have a low complexity of Bluetooth for local communication with UL logic of remote network functionality. For the convenience of description, the present invention is described based on 3GPP LTE hereinafter, but the present invention is not limited thereto. The present invention may be applied to a random network in which multiple devices in proximity with each other perform wireless communication with random node.

FIG. 6 shows an example of connection scenario according to an embodiment of the present invention. In this embodiment and the present invention to be described hereinafter, multiple devices in proximity with each other may be defined as "device group". In device group, a specific device may be defined as a primary device, and other devices may be defined as a secondary device.

Referring to FIG. 6, the eNB and a primary device have a primary connection for U-plane/C-plane. The primary device can communicate with LTE/remote network directly. Further, the eNB and a secondary device (e.g. low complexity UE) have a secondary connection for U-plane. The secondary device may support only UL transmission to the LTE/remote network. Or, the secondary device may support both DL transmission from the LTE/remote network and UL transmission to the LTE/remote network. The primary connection carries DL data for the secondary device, as well as DL data for the primary device. The DL data for the secondary device may be transmitted via direct communication between the primary device and the secondary device. The communication between the primary and secondary devices may be based on one of LTE D2D, Wi-Fi, Bluetooth or any other local communication protocol. The communication between the primary and secondary devices may mostly be based on proximity communication and thus the power required for the communication can be limited/reduced. The secondary connection carries only UL data for the secondary device.

For example, the primary device may be a smartphone, which functions as a controller, and the secondary device may be an IoT device. For another example, a human (e.g. home owner) may provide a relay communication as a primary device (or user) between the network and the secondary device. That is, an IoT device attached to a light, i.e. secondary device, may receive DL data from the remote network when the primary user is around. When the primary user is not available, the secondary device still can transmit UL data to the remote network.

According to this connection scenario, the secondary device may have simplified or no DL functionality, which can reduce complexity of the secondary device. Further, the secondary device may be charged on only for active UL transmissions, which means low service charge.

Hereinafter, various aspects of the connection scenario described above according to an embodiment of the present invention are described. In the description below, for the convenience of description, a UE with UL capability only (and optionally synchronization capability) may be called a remote UE, and a UE who can perform relaying and DL reception on behalf of the remote UE may be called a relay UE.

(1) Connection Setup Procedure

As a UE capability, one of the following options may be considered. It is assumed that a remote UE supports DL/UL transmission with a proximity UE, i.e. relay UE, via Wi-Fi, Bluetooth or local communication.

The remote UE may support only UL transmission to the network without any DL functionality. In this case, UL transmission from the remote UE may be performed as follows.

1) A remote UE wakes up since it has any UL data to be transmitted.

2) The remote UE searches nearby DL capable UE(s), i.e. relay UE. For this, DL capable UE(s) who is willing to perform relaying function may advertise its capability periodically via proximity protocols such as Wi-Fi Direct. When the remote UE does not find any relay UE(s), the remote UE cannot initiate UL transmission. Thus, the remote UE may set a timer based on generated random number and go back to sleep and wait the timer to expire.

3) If the remote UE finds any relay UE, the remote UE may first acquire synchronization information from the relay UE. Once the remote UE acquires synchronization information from the relay UE, the remote UE may initiate UL transmission via such as random access channel (RACH) procedure which is more robust with timing/frequency error.

Alternatively, the remote UE may support UL transmission to the network and the remote UE may also support basic synchronization functionality by receiving pilot signals from the network. In this case, UL transmission from the remote UE may be performed as follows.

1) A remote UE wakes up since it has any UL data to be transmitted.

2) If the remote UE does not have any information about a cell of LTE network, the remote UE searches nearby DL capable UE(s), i.e. relay UE. For this, DL capable UE(s) who is willing to perform relaying function may advertise its capability periodically via proximity protocols such as Wi-Fi Direct. When the remote UE does not find any relay UE(s), the remote UE cannot initiate UL transmission. Thus, the remote UE may set a timer based on generated random number and go back to sleep and wait the timer to expire.

3) If the remote UE finds any relay UE, the remote UE may first acquire the information about the cell, e.g. cell identifier (ID), system frame number (SFN) information, bandwidth, etc. The information carried in system information and/or information needed to identify the cell and/or information to acquire synchronization signals (such as primary synchronization signal (PSS)/secondary synchronization signal (SSS)/cell-specific reference signal (CRS)) may be informed to the remote UE via a relay UE. Once the remote UE acquires necessary information, the remote UE may perform synchronization based on the known information by receiving the information from the eNB directly. In other words, the remote UE supporting basic synchronization functionality may at least keep track of synchronization even though there is no relay UEs in proximity. It may also be possible that the remote UE cannot acquire synchronization directly from the cell, since the known cell may not be reachable due to remote UE moving out of the coverage or the cell is not working properly. In this case, the remote UE may need to update the information from the relay UE. Thus, the remote UE may perform searching of relay UE(s) in proximity periodically to update the necessary information. As information necessary for synchronization, at least one of the followings may be considered.

- Physical cell ID (PCID) of the serving cell (camp-on cell or connected cell)
- SFN information of the serving cell
- Offset between subframe #0 and the current time of transmission: This information may be used to locate the current time compared to subframe boundary of the serving cell.
- TDD/FDD information and/or synchronization signal format. For example, if PSS/SSS is used for synchronization, the exact location of PSS/SSS should be known to the remote UE. If CRS is used for synchronization, CRS vshift value should be known to the remote UE.
- Frequency offset between the frequency which is used between the network and relay UE and center frequency of the serving cell. This is to use frequency tuning of the remote UE to search the synchronization signal.
- Interval of synchronization signal transmission (if not predefined): If synchronization signal is periodically transmitted which is not prefixed (such as every 5 ms for PSS/SSS), the periodicity or interval information of synchronization signal should be known.

In general, time/frequency resource of synchronization signal and the sequence used for synchronization signal may be known to the remote UE such that the remote UE performs only matching function to acquire synchronization signals. It may minimize blind detection burden on the remote UE for acquiring synchronization signals. Also, the same cell can be used between the remote UE and relay UE in terms of synchronization, and other services.

(2) RRC Connection

A remote UE having UL capability only cannot receive paging from the eNB directly. A relay UE, if negotiated between the relay UE and the remote UE, can receive and store paging on behalf of the remote UE. To store the paging, the remote UE may register paging relaying function to the relay UE. When paging relaying function is configured, the relay UE may report its paging relaying service to the network to inform that in the same paging occasion, the relay UE may monitor IDs of both UEs. In other words, the paging occasion of the remote UE may be defined as the same paging occasion of relay UE. The network may page the remote UE using the same paging occasion. In other words, the same paging occasion may be used for more than one UE. The relay UE may monitor paging occasion for either remote UE or relay UE itself. The relay UE may also monitor both paging messages. When the paging is received, if the remote UE is in proximity with the relay UE, the relay UE may deliver the paging to the remote UE. If the remote UE is not in proximity with the relay UE, paging relaying function may be handled as follows.

Paging relaying function may be aborted, as the paging relaying function will be performed only by a cell which can support both the remote UE and relay UE at the same time. Once the tracking area is changed, paging relaying function may not hold any further. In this case, the relay UE may indicate to the remote UE about the stop of paging relaying function so that the remote UE can find another relay UE in proximity. Since the remote UE may be in the sleep, to exchange such information as well as the paging message relaying, periodic monitoring of relay UE by the remote UE may be assumed. The remote UE may determine that the paging relaying function has been stopped by detecting any message from the relay UE.

Alternatively, paging relaying function may be remained as long as the relay UE does not terminate the paging relaying function. If the relay UE wants to abort, the relay UE may signal to the network. This may require store of paging message of the remote UE in the relay UE, since the relay UE cannot forward paging message immediately. However, this may be more efficient since this may allow very long sleep time of the remote UE though the relay UE can perform periodic paging reception on behalf of the remote UE. This option may be more efficient if the remote UE is not expected to have a lot of paging indication.

For RRC configuration, any RRC configuration for DL transmission may not be necessary for the remote UE. For UL transmission, RRC configuration may be delivered to the remote UE via the relay UE. Or, the same RRC configuration as the relay UEs may be used for the remote UE. For connection, the network may not maintain the connection information to the remote UE. Instead, the network may maintain the information of dependent UE IDs per each relay UE. In other words, the network does not maintain the information of the remote UE individually. For data usage via UL transmission or DL transmission, the usage may be logged either directly or indirectly.

(3) UL Resource Configuration

Since the remote UE cannot acquire the UL grant dynamically, the grant which is pre-configured may be used for the remote UE. It may be requested by the remote UE. When the remote UE requests the pre-grant, the ID of the relay UE may also be piggybacked so that the relay UE can receive the response and forward the pre-grant to the remote UE. This may mean that pre-grant may be transmitted only when the remote and relay UEs are paired with each other. Resources for the pre-grant may have a valid time, and it may expire if there is no data transmission during the valid time. It may be reset whenever there is UL transmission from the remote UE.

When UL resource is configured, initial power (which may be used continuously if not updated), modulation and coding scheme (MCS), the number of RBs, periodicity of resource may also be configured. If those configurations are not given, a default configuration, such as the maximum UE power, quadrature phase shift keying (QPSK) with MCS=1, 1 RB (or one subcarrier), etc., may be assumed. When the remote UE does not have any UL data to transmit, the remote UE may skip transmission of the scheduled UL. To maintain the validity of the configured resource, the remote UE may transmit UL data in the configured resource regardless of whether UL data actually exists or not. When the network receives "no data" UL transmission, the network may increase the periodicity to reduce the configured resource of the remote UE via the relay UE. Another approach is to request increase or decrease via UL transmission from the remote UE. Any type of adaptation may work only when the relay UE is paired with the remote UE.

(4) ACK/NACK Handling

If DL reception from the network occurs, the remote UE may transmit ACK/NACK using the preconfigured resource. The CK/NACK may be application-level ACK/NACK which may be transmitted as a payload. When UL transmission is received from the remote UE, ACK/NACK from the network may be forwarded to the relay UE If the relay UE is paired with the remote UE. To support this, the relay UE may inform the network whether the pairing with the remote UE is alive or put on hold or terminated. If pairing is not valid, the network may not transmit ACK/NACK as a response to the UL transmission. If pairing is valid, and the network transmits ACK/NACK, the network may also indicate the resource which may be used for retransmission. Unless retransmission resource is configured, the remote UE may not retransmit UL transmission. In general, since interactive ACK/NACK mechanism may not be available, it is desirable to repeat the transmission initially. If the network wants to configure repetition, the network may configure multiple UL resources or configure appropriate MCS. Another mechanism is to use different power level depending on the pairing status. If paring is valid, the remote UE may use power P1 (which is generally lower than the maximum power) to minimize the power consumption. The network may configure the resource based on power P1. If paring is no valid, the remote UE may use the maximum power. P1 and maximum power may be configured by the network.

(5) Cell Selection and Reselection

Since the remote UE does not have capability to perform measurement, the remote UE may rely on the potential relay UE(s) in proximity for cell selection and/or reselection. If there are multiple potential relay UEs, the remote UE may choose the relay UE based on signal to interference and noise ratio (SINR) between two UEs. The cell chosen by the relay UE may be selected as the cell for the remote UE. If the remote UE is far from the cell which the relay UE is associated with, the UL transmission may not be successful. Thus, some cell association mechanism may be used based on pairing.

The cell selection and/or reselection procedure may be performed as follows.

1) A remote UE selects a relay UE.

2) The relay UE forwards the information about the serving cell to the remote UE.

3) The remote UE performs synchronization for the given serving cell.

4) When the synchronization is completed, the remote UE transmits a cell association message to the network (and forward it to the relay UE) which contains the ID of the relay UE.

5) The network accepts the cell association message and responds to the relay UE.

6) When the relay UE receives the response, the relay UE reports success and pairing information to the network and the remote UE.

7) If the network does not receive the cell association message successfully, or the relay UE does not receive the response from the network in a given time, the network or relay UE may consider the UL transmission was not successful, and request the remote UE of retransmission of cell association message up to the maximum number of trials. If the response was not successful after the maximum trial, the relay UE aborts the pairing.

8) When the paring is aborted, the remote UE finds another relay UE.

The cell association message may use timing advance used by the relay UE or may start with physical random access channel (PRACH) transmission. If PRACH transmission is used, random access response (RAR) response may be forwarded by the relay UE to the remote UE. Or, the relay UE may perform RACH procedure and request the remote UE to transmit PRACH or Message 3 based on the timing/configuration.

(6) Timing Advance Handling

Timing advance value may be changed. In other words, initial value used in cell association may be used, unless a new value is configured. Or, a very long CP may be used for remote UEs which may not have tight timing advance values. Or, TA=0 may be used if TA is not configured by the remote UE, otherwise, TA value configured by the remote UE may be used. Timing advance adaptation (and also power adaptation) may be done via the relay UE if necessary when pairing is valid.

FIG. 7 shows a method for performing UL transmission according to an embodiment of the present invention. The embodiments of the present invention described above may be applied to this embodiment. In this embodiment, the first UE may refer to the primary device and/or relay UE describe above, and the second UE may refer to the secondary device and/or remote UE described above.

In step S100, the second UE wakes up for transmission of UL data. In step S110, the second UE searches a first UE which is capable of downlink (DL) transmission to the second UE. In step S120, the second UE acquires information for transmission of the UL data. In step S130, the second UE transmits the UL data to a network by using the acquired information.

The second may be only capable of UL transmission to the network and not capable of DL reception from the network. In this case, the information for transmission of the UL data may be acquired from the first UE. The second UE may further acquire synchronization from the first UE by using acquired information.

Alternatively, the second UE may be capable of UL transmission to the network and capable of synchronization from the network. In this case, the information for transmission of the UL data may be acquired from the network. The information for transmission of the UL data may include at least one of a cell ID of a serving cell, SFN information of the serving cell, an offset between subframe #0 to a current time of transmission, TDD/FDD information, a synchronization signal format, or an interval of synchronization signal transmission. The second UE may further acquire synchronization from the network by using acquired information. The second UE may further search UEs in proximity periodically.

The second UE may further receive a paging message from the network via the first UE. The second UE may further request a pre-grant for transmission of the UL data to the network. The second UE may further receive the pre-grant from the network via the first UE.

FIG. 8 shows a wireless communication system to implement an embodiment of the present invention.

A first UE 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing uplink (UL) transmission, by a second user equipment (UE), in a wireless communication system, the method comprising:
waking up for transmission of UL data;
searching for a first UE which is capable of downlink (DL) transmission to the second UE;
receiving first information related to the transmission of the UL data from the first UE;
receiving second information including information related to a pre-granted UL resource and a valid time for the pre-granted UL resource from the first UE,
wherein the second information was transmitted from a serving cell to the first UE, and
wherein the pre-granted UL resource is valid during the valid time; and
transmitting the UL data on the pre-granted UL resource during the valid time to the serving cell based on the first information,
wherein the second UE is capable of UL transmission directly to the serving cell and the second UE is capable of DL reception indirectly from the serving cell via the first UE.

2. The method of claim 1, wherein the pre-granted UL resource expires based on that the transmission of the UL data is not performed during the valid time, and
wherein the valid time is reset based on that the transmission of the UL data is performed during the valid time.

3. The method of claim 2, further comprising performing synchronization from the first UE based on the first information.

4. The method of claim 1, wherein the second UE is capable of performing synchronization from the serving cell.

5. The method of claim 4, wherein the first information is received from the serving cell.

6. The method of claim 4, further comprising performing the synchronization from the serving cell based on the first information.

7. The method of claim 1, wherein the first information includes at least one of a cell identifier (ID) of the serving cell, system frame number (SFN) information of the serving cell, an offset between subframe #0 to a current time of transmission, time division duplex (TDD)/frequency division duplex (FDD) information, a synchronization signal format, or an interval of synchronization signal transmission.

8. The method of claim 1, further comprising searching for UEs in proximity periodically.

9. The method of claim 1, further comprising receiving a paging message from the serving cell via the first UE.

10. The method of claim 1, further comprising requesting the second information to the serving cell via the first UE.

11. A second user equipment (UE) in a wireless communication system, the second UE comprising:
a memory;
a transceiver; and
a processor, operatively coupled to the memory and the transceiver, the processor is configured to:
wake up for transmission of uplink (UL) data;
search for a first UE which is capable of downlink (DL) transmission to the second UE;
control the transceiver to receive first information related to the transmission of the UL data from the first UE;
control the transceiver to receive second information including information related to a pre-granted UL resource and a valid time for the pre-granted UL resource from the first UE,
wherein the second information was transmitted from a serving cell to the first UE, and
wherein the pre-granted UL resource is valid during the valid time; and
control the transceiver to transmit the UL data on the pre-granted UL resource during the valid time to the serving cell based on the first information,
wherein the second UE is capable of UL transmission directly to the serving cell and the second UE is capable of DL reception indirectly from the serving cell via the first UE.

12. The second UE of claim 11, wherein the pre-granted UL resource expires based on that the transmission of the UL data is not performed during the valid time, and
wherein the valid time is reset based on that the transmission of the UL data is performed during the valid time.

13. The second UE of claim 11, wherein the second UE is capable of performing synchronization from the serving cell.

14. The second UE of claim 13, wherein the first information is received from the serving cell.

15. The second UE of claim 13, the processor is further configured to:
perforin the synchronization from the serving cell based on the first information.

16. The second UE of claim 11, wherein the first information includes at least one of a cell identifier (ID) of the serving cell, system frame number (SFN) information of the serving cell, an offset between subframe #0 to a current time of transmission, time division duplex (TDD)/frequency division duplex (FDD) information, a synchronization signal format, or an interval of synchronization signal transmission.

17. The second UE of claim 11, the processor is further configured to:
search for UEs in proximity periodically.

18. The second UE of claim 11, the processor is further configured to:
control the transceiver to receive a paging message from the serving cell via the first UE.

19. The second UE of claim 11, the processor is further configured to:
control the transceiver to request the second information to the serving cell via the first UE.

* * * * *